United States Defensive Publication [19] (H) [11] T977,004

Dulat et al. [43] Dec. 5, 1978

[54] FIRE RETARDANT POLYMER COMPOSITIONS

[75] Inventors: Joseph Dulat, Fetcham; Leonard T. Arthur, Tolworth, both of England

[73] Assignee: United States Borax & Chemical Corporation, Los Angeles, Calif.

[21] Appl. No.: 888,061

[22] Filed: Mar. 20, 1978

Related U.S. Application Data

[63] Continuation-in-part of Ser. No. 783,925, Apr. 1, 1977, abandoned.

[51] Int. Cl.[2] ..... C08K 5/09

[52] U.S. Cl. ..... 260/23 S; 260/45.75 W; 260/23 H; 260/45.7 RT; 260/22 XA

[57] ABSTRACT

A non-halogenated polymer such as polystyrene, polyesters, polymono-olefins or ABS resins is made fire retardant by a low loading combination of a halogenated hydrocarbon fire retardant, zinc borate and a metal soap. The halogenated hydrocarbon preferably contains bromine or a combination thereof with chlorine. Suitable zinc borates are the hydrated zinc borates well known in the art. Metal soaps are preferably those of the metals calcium, zinc, aluminum, barium, cadmium and combinations thereof.

Both synergistic fire retardancy and lower smoke emission are exhibited as compared to compositions excluding the metal soap.

10 Claims, No Sheets Drawing,

11 Pages Specification

The file of this unexamined application may be inspected and copies thereof may be purchased (849 O.G. 1221, Apr. 9, 1968).